United States Patent [19]

Jordan

[11] Patent Number: 5,325,734
[45] Date of Patent: Jul. 5, 1994

[54] DEVICE FOR POSITIONING A SENSOR

[75] Inventor: Martin Jordan, Koblenz, Fed. Rep. of Germany

[73] Assignee: Lucas Industries public limited company, Solihull, England

[21] Appl. No.: 859,725

[22] PCT Filed: Oct. 24, 1991

[86] PCT No.: PCT/EP91/02021

§ 371 Date: Jun. 21, 1992

§ 102(e) Date: Jun. 12, 1992

[87] PCT Pub. No.: WO92/08136

PCT Pub. Date: May 14, 1992

[30] Foreign Application Priority Data

Oct. 24, 1990 [DE] Fed. Rep. of Germany ....... 4033860

[51] Int. Cl.⁵ .................. G01D 21/00; G01P 1/02; G01B 7/14

[52] U.S. Cl. .................. 73/866.5; 73/494; 324/207.25

[58] Field of Search .......... 73/866.5, 493, 494; 324/207.25, 207.20, 207.19, 207.16, 207.15, 178, 173, 166

[56] References Cited

U.S. PATENT DOCUMENTS 2,780,094  2/1957  Fink ........................ 73/866.5
3,778,692  12/1973  Angersbach et al. .......... 324/207.25
5,018,384  5/1991  Hayashi et al. .............. 73/866.5

FOREIGN PATENT DOCUMENTS 2548773  5/1977  Fed. Rep. of Germany ... B60T 8/02
3231821  5/1984  Fed. Rep. of Germany ...... B60R 11/00
3242537  5/1984  Fed. Rep. of Germany ............. 324/207.15
3332545  4/1985  Fed. Rep. of Germany ...... F16B 21/00
2144224  2/1985  United Kingdom ........ G01P 3/488

OTHER PUBLICATIONS

IBM Technical Disclosure Bulletin, vol. 11, No. 9, Feb. 1969, New York, Rigotti, J. M., Adjustable Transducer.

Primary Examiner—Hezron E. Williams
Assistant Examiner—Daniel S. Larkin
Attorney, Agent, or Firm—Oblon, Spivak, McClelland, Maier & Neustadt

[57] ABSTRACT

A holding device for positioning a sensor (12) with respect to a body (10), with a spacing (x) precisely adjusted between the sensor and the body, comprises a spring (28) which biases the sensor in the direction of the body and a movable adjusting member (24) which, when being moved between first and second positions, moves the sensor (12) against the bias of the spring (28) such that the sensor becomes located at spacing (x) from the body (10).

11 Claims, 3 Drawing Sheets

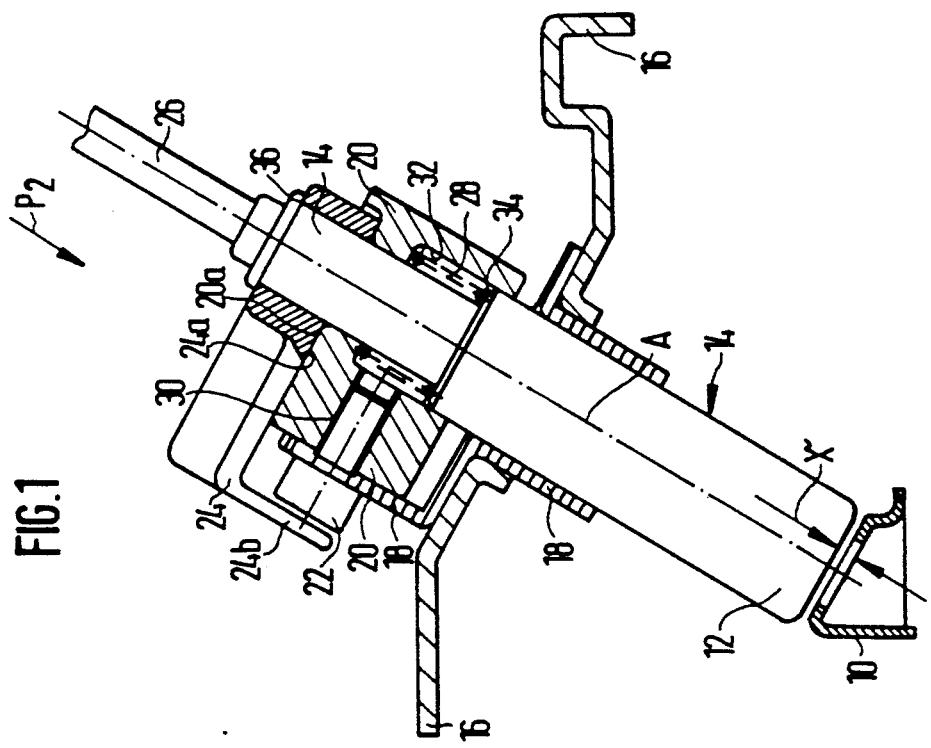
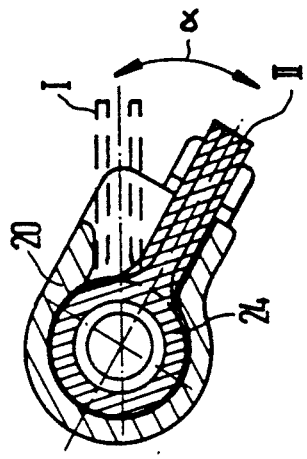

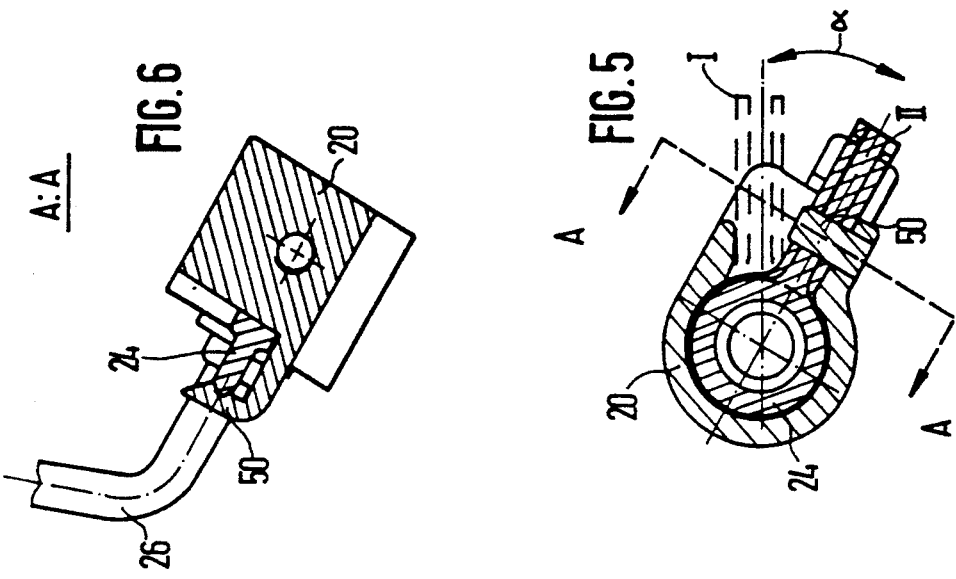
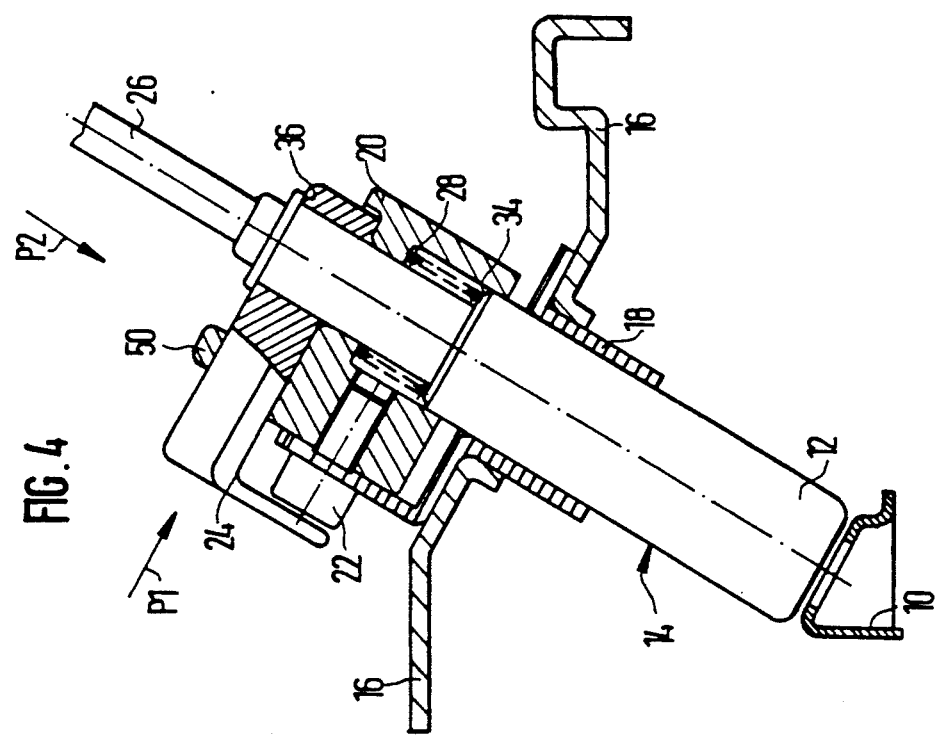

DEVICE FOR POSITIONING A SENSOR

The invention relates to a device for positioning a sensor with respect to a body, with a spacing being precisely adjusted between the sensor and the body.

A holding device of that kind is known from DE 36 18 528 A1. The sensor provided in that case serves as a detector of the rotational speed of a vehicle wheel (as does the preferred embodiment of the instant invention) and is used for ABS control (anti-lock control).

Sensors employed in ABS systems for measuring the rotational behavior of the wheels in most cases operate according to the principle of electromagnetic induction. A pole wheel formed with teeth around its circumference rotates with respect to a stationary sensor (coil with an iron core) and tension is induced in the coil as the pole wheel moves. Attempts are made to keep the distance between the pole wheel and the sensor as small as possible.

Typically, the air gap between the sensor housing and the pole wheel is approximately 0.5 mm wide. This already is within the range of manufacturing tolerance of the structural members and the mounting accuracy.

A sensor which is to be adjustable accurately and reliably is known from DE 36 18 528 A1, mentioned initially. A holding device for a signal transmitter which is said to be adapted for easy mounting is known from DE 33 32 545 A1 which, however, is not concerned with the positioning of the signal transmitter in relation to a body which is independent of the holding device for the signal transmitter.

The instant invention has for its aim to provide a holding device for positioning a sensor with respect to a body which holding device permits easy adjustment of the spacing between the sensor and the body and still operates reliably during a long service life under high stress (environmental influences, shock and acceleration stresses) and yet can be produced economically.

What is provided to solve this problem is a spring which biases the sensor in the direction of the body and an adjusting member which is movable between at least two positions and which, when being moved from the first to the second position, moves the sensor against the bias of the spring such that the sensor becomes located at the desired spacing from the body.

(Other than the prior art according to DE 33 32 545, for example) the instant invention thus is aimed at providing a device which not only holds the sensor but also adjusts it above all with respect to a body, such as a pole wheel. To accomplish that, it is preferably provided that, in mounting the device according to the invention by placing the sensor on the body (e.g. the pole wheel), first all the tolerances of the structural members are compensated by means of a fastening screw.

The holding device according to the invention is preferred for positioning a rotational speed sensor with respect to a pole wheel which is connected to a rotating vehicle wheel, being used in the context of an ABS control system. With this application of the invention, the term "stationary" is equivalent in meaning to "fixed to the vehicle". According to a particularly preferred modification of the holding device according to the invention it is provided for the adjusting member, upon moving from the first to the second position, to alter its distance from a stationary support, especially in accordance with the desired spacing between the sensor and the body.

In moving between its positions, the adjusting member can carry out translatory and/or rotational movements. Preferably, the adjusting member is embodied by a pivotable lever which carries out rotary motions between the two positions.

According to another preferred modification of the holding device according to the invention it is provided that the adjusting member is biased by a spring in the direction of the stationary support and engages a stop which is firmly connected to the sensor.

An exceptionally compact (space-saving) structure of the overall arrangement of the holding device, the sensor, etc. is achieved if the stationary support comprises a support body adapted to be mounted stationarily by a fastening means and formed with a recess which guides a housing receiving the sensor.

Reliable positioning of the individual structural components with respect to each other is obtained with a further development of embodiment described above in that the support body, with its recess, presents a cage for the spring and that the spring, at the same time, is guided between the support body and the sensor housing.

According to another modification of the invention it is provided that the adjusting member, when in its second position, covers the fastening means of the support body. That prevents unintentional loosening of the holding device and, at the same time, guarantees that in case of exchange of the sensor subsequently the precise adjustment of the spacing between sensor and body (pole wheel) is made.

Embodiments of the invention will be described in greater detail below with reference to the drawing, in which:

FIG. 1 shows a first embodiment of a holding device for positioning a sensor with respect to a body;

FIG. 2 is a view in the direction of arrow $P_2$ of the holding device shown in FIG. 1;

FIG. 4 shows another embodiment of a holding device for positioning a sensor with respect to a body;

FIG. 5 is a view in the direction of arrow $P_2$ of the holding device shown in FIG. 4; and FIG. 6 is a view in the direction of arrow $P_1$ of the holding device shown in FIG. 4.

Figure 3:
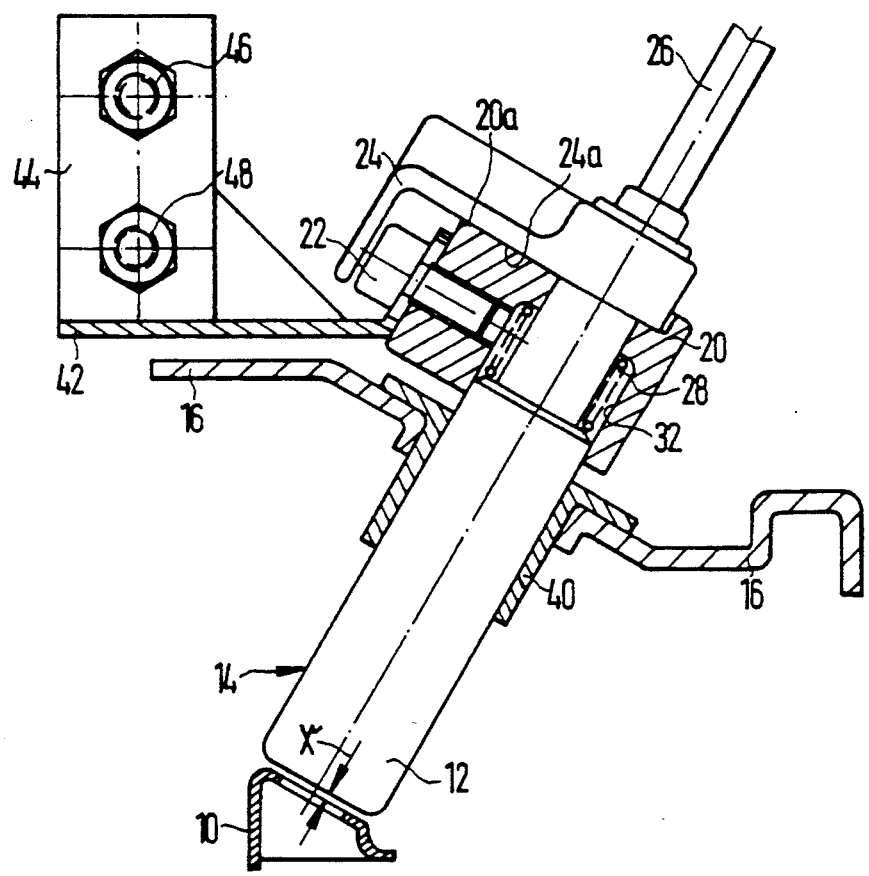
FIG. 3 shows another embodiment of a holding device for positioning a sensor with respect to a body.

FIG. 1 shows a pole wheel connected to a motor vehicle wheel as an example of a body 10 with respect to which the position of a sensor 12 is to be adjusted precisely at spacing "x". In the figures the position of the sensor is indicated by reference numeral 12. The sensor is located in a housing 14 and not shown or described in detail here since it is known per se to those skilled in the art.

In the embodiment illustrated in FIG. 1 the sensor 12 is mounted on the protective shield 16 of the brakes of a vehicle. A sheet metal retaining means 18 secured to the protective shield 16 of the brake serves for mounting.

The sensor housing 14 (and thus the sensor 12) is supported and positioned with respect to the pole wheel 10 by a support body 20 which is secured to the retaining means 18 by a fastening means 22. To this end the fastening means 22 is embodied by a screw which is threaded into a threaded bore 30 of the support body 20.

The support body 20 is formed throughout with a cylindrical recess 32 having different diameters. The housing 14 of the sensor 12 passes through this recess 32.

In a first portion the recess 32 has a diameter which corresponds exactly to the associated diameter of the housing 14 so that the housing 14 is guided for axial movement in the recess 32. Moreover, the recess 32 has an enlarged portion which forms a cage for a spring 28 biasing the housing 14 (and thus the sensor 12) in the direction of the pole wheel 10.

The housing 14 includes two stops 34, 36. Stop 34 of the housing 14 is engaged by the spring 28 the other end of which rests on the support body 20 so that the housing 14 is biased downwardly to the left as seen in FIG. 1.

Stop 36 of the housing 14 abuts against the adjusting member 24 so that the adjusting member 24 is pressed downwardly to the left in FIG. 1 against the support body 20.

The contiguous surfaces 20a of the support body 20 and 24a of the adjusting member 24 are mutually engaged by face-end teeth. As a consequence, rotation of the adjusting member 24 about axis A widens or narrows the spacing between the adjusting member 24 and the support body 20, depending on the direction of rotation. To this end the adjusting member 24, according to FIG. 2, is movable between two positions I, II, being rotated through angle about the axis A. In position II between the adjusting member 24 and the support body 20, the housing 14 is shifted in upward direction to the right by a distance "x" with respect to the body 10 due to the toothings at surfaces 20a, 24a.

Therefore, assembly and adjustment of the sensor according to FIGS. 1 and 2 takes place as follows: First, a unit is assembled of a housing 14, adjusting member 24, and support body 20 and then secured to the mounting means 18 by the screw 22. The screw 22 passes through an oblong hole in the mounting means 18 so that the entire unit can be pushed in downward direction to the left in FIG. 1 until the end surface of the housing 14 hits the opposite surface of the pole wheel 10. The distance between the sensor and the pole wheel under these conditions is zero. With respect to the support body 20 the adjusting member 24 is now in position I. Thereupon the screw 22 is tightened, and then the adjusting member 24 is moved from position I into position II (FIG. 2), the housing 14 with the sensor 12 thereby being shifted in upward direction to the right by the distance "x" due to the toothing of the surfaces 20a, 24a. Thus in position II the operating position of the sensor has been reached in which it is located at a spacing "x" of approximately 0.5 mm with respect to the pole wheel 10.

In operating position II an arm 24b of the adjusting member 24 covers the screw 22 so that the latter cannot be rotated unintentionally. This is additional guaranty that after an exchange of the sensor subsequently exact adjustment of the spacing again is made.

The figures further show a cable 26 which passes the sensor signals on to some evaluation electronics.

FIG. 3 shows a modification of the embodiment according to FIGS. 1 and 2. Corresponding structural components are marked by the same reference numerals.

In the case of the embodiment according to FIG. 3 the support body 20 is not mounted on the protective shield 16 of the brake but instead on a so-called axle attachment (i.e. a component part firmly connected to the axle of the vehicle). This has the advantage that the transmission of vibrations to the sensor is reduced. In this case a guide sleeve 40 is positioned between the sensor housing 14 and the protective shield 16 of the brake. Preferably, the guide sleeve 40 is made of elastic material so as to dampen the transmission of vibrations.

The support body 20 is mounted by a screw 22 on the axle attachment, according to FIG. 3, the mounting again being effected by means of an oblong hole, as described above. The axle attachment 42 is secured by way of a fastening plate 44 and by means of screws 46, 48 so as to be fixed to the vehicle.

FIGS. 4 to 6 show a further development of the embodiment according to FIG. 4, the further development consisting in a holding clip 50 which embraces the adjusting member 24 in operating position II (cf. FIG. 5) so that the adjusting member is locked in the operative position.

FIG. 5 shows a view of the adjusting member in operating position II from the direction of arrow P2 in FIG. 4, while FIG. 6 shows a view of the adjusting member 24, likewise in operating position II, from the direction of arrow P1 in FIG. 4. The figures make it clear that the holding clip 50 is connected to the support body 20 and snaps into engagement with the adjusting member 24 in operating position II (cf. FIG. 6) in order to arrest the adjusting member in force lock. With this embodiment the spring 28 may be made shorter than in the case of the embodiment according to FIG. 1 since part of the wheel accelerations which can be transmitted to the sensor now are accommodated by the holding clip 50.

What is claimed is:

1. A device for positioning a sensor (12) with respect to a body (10) with a spacing (X) precisely adjusted between said sensor (12) and said body (10) comprising:
   (a) a stationary support (16, 20) for said sensor (12);
   (b) a spring (28) biasing said sensor (12) with respect to said support (16, 20) towards said body (10);
   (c) an adjustment member (24) carried by said support (16, 20) and having an operative connection with said sensor (12), said adjustment member (24) being movable with respect to said support (16, 20) between first and second positions (I, II);
   (d) said adjustment member (24) upon movement from one of its positions (I or II) to the other (II or I) effecting movement of said sensor (12) to a predetermined position located precisely at said spacing (X) from said body;
   (e) said spring (28) also biasing said adjustment member (24) towards said stationary support (16, 20).

2. The deice of claim 1 wherein movement of said adjustment member (24) between its first and second positions (I, II) is translational.

3. The device of claim 1 wherein movement of said adjustment member (24) between its first and second position (I, II) is rotational.

4. The device of claim 1 wherein movement of said adjustment member (24) between its first and second position (I, II) is translational and rotational.

5. The device of claim 1 wherein said adjustment member (24) comprises a pivotable lever (24(b)).

6. The device of claim 1 wherein said sensor (12), includes a stop (36) which engages said adjustment member (24) to operatively connect said sensor (12) to said adjustment member (24), said spring (28) biasing said adjustment member (24) towards said stationary support (16, 20) through said stop (36).

7. The deice of claim 1 wherein said sensor (12) is fixed to a housing (14), said stationary support (16, 20) including a recess (32) in which said housing (14) is received.

8. The device of claim 7 wherein said recess (32) includes a cage for said spring (28) disposed between said support (16, 20) and said housing (14) said spring (28) being stressed in said cage between said stationary support (16, 20) and said housing (14) to bias the latter and hence said sensor towards said housing (10).

9. The device of claim 1 wherein said stationary support (16, 20) is in two parts (16 and 20), a fastener (22) connecting said parts (16 and 20) together, said adjustment member 924) including an element (24(b)) which, when said adjustment member is in that one of its positions (I, II) at which said sensor (12) is located at spacing (X) from said body (10), covers said releasable fastener (20).

10. The device of claim 1 wherein said sensor (12) is an electromagnetic induction sensor and said body (10) is a rotating pole wheel connected to a wheel of a motor vehicle.

11. The device of claim 1 wherein in one of said positions (I, II) of said adjustment member (24) said sensor (12) is in direct contact with said body (10) and the spacing between said sensor (12) and body (10) is zero, said adjustment member (24), upon movement to its other position (I, II), moving said sensor (12) out of contact with said body (10) to that position where the spacing between said sensor (12) and said body (10) is precisely (X).

* * * * *